United States Patent [19]
Toth

[11] 3,921,440
[45] Nov. 25, 1975

[54] ULTRASONIC PIPE TESTING SYSTEM

[75] Inventor: Endre Leslie Toth, Lancaster, Ohio

[73] Assignee: Air Products and Chemicals, Inc., Allentown, Pa.

[22] Filed: Jan. 2, 1975

[21] Appl. No.: 538,033

[52] U.S. Cl. .......................... 73/67.8 S; 73/71.5 US
[51] Int. Cl.² ........................................ G01N 29/04
[58] Field of Search ............ 73/67.8 R, 67.8 S, 67.9, 73/71.5 US

[56] References Cited
UNITED STATES PATENTS

| | | | |
|---|---|---|---|
| 2,532,507 | 12/1950 | Meunier | 73/71.5 US X |
| 3,248,933 | 5/1966 | Stebbins | 73/71.5 US |
| 3,257,843 | 6/1966 | Cowan | 73/71.5 US |
| 3,575,044 | 4/1971 | Gibbs | 73/67.9 |
| 3,777,552 | 12/1973 | Fletcher | 73/67.8 S |

OTHER PUBLICATIONS

R. Lewis et al., Automatic Ultrasonic Inspection of Steel Tubes Ultrasonics for Industry, 1969, Conference Papers, London, England, 10-7-69.

*Primary Examiner*—Richard C. Queisser
*Assistant Examiner*—John P. Beauchamp
*Attorney, Agent, or Firm*—James C. Simmons; Barry Moyerman

[57] ABSTRACT

An ultrasonic inspection system for providing volumetric testing of circumferential welds in piping or other structural shapes of regular cross section. The inspection system permits inspection in longitudinal, circumferential shear, and axial shear modes and is characterized by having a carriage mountable on the pipe to be inspected with remote control of the position of the test head and remote gathering of data. This system is readily adaptable to the needs of the nuclear industry for inspecting pipes exposed to radiation from a remote location.

A further feature of the invention encompasses a flexible boot covering the transducer, the boot being pressurized with a liquid couplant for providing ultrasonic coupling through the pressurized couplant between the object and the boot.

8 Claims, 8 Drawing Figures

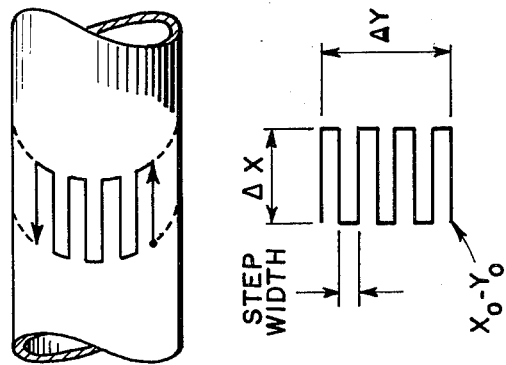
FIG. 6a
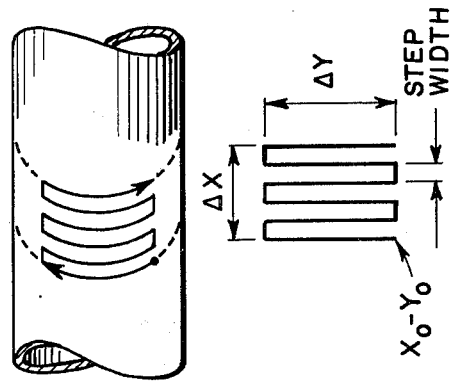
FIG. 6b
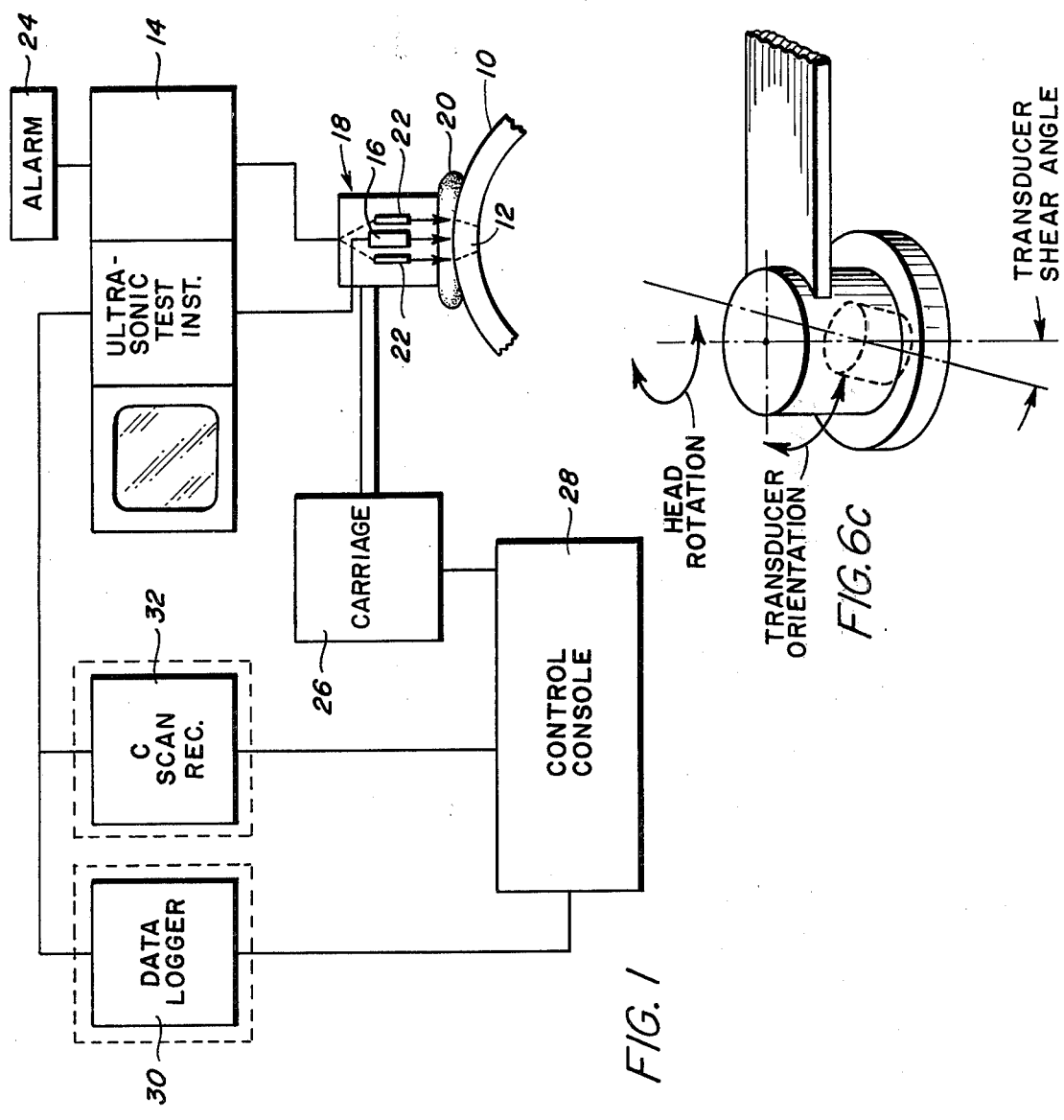
FIG. 1
FIG. 6c

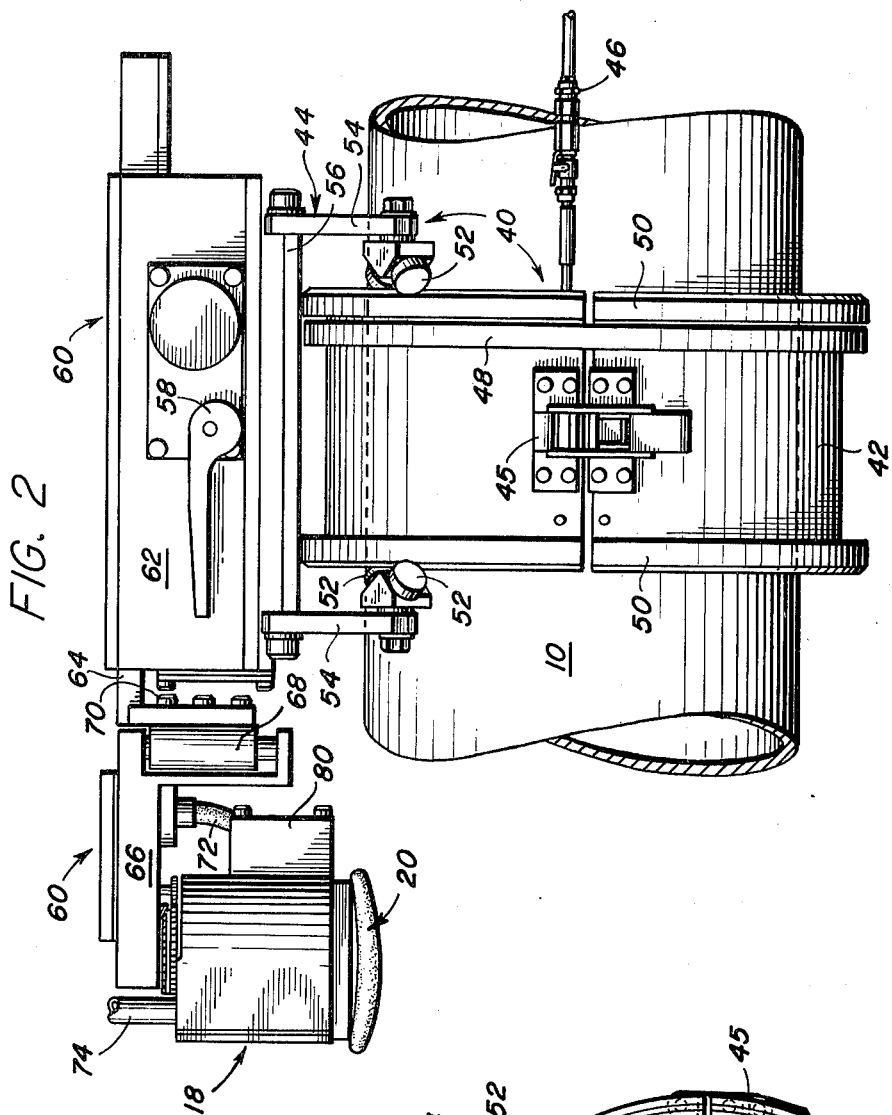
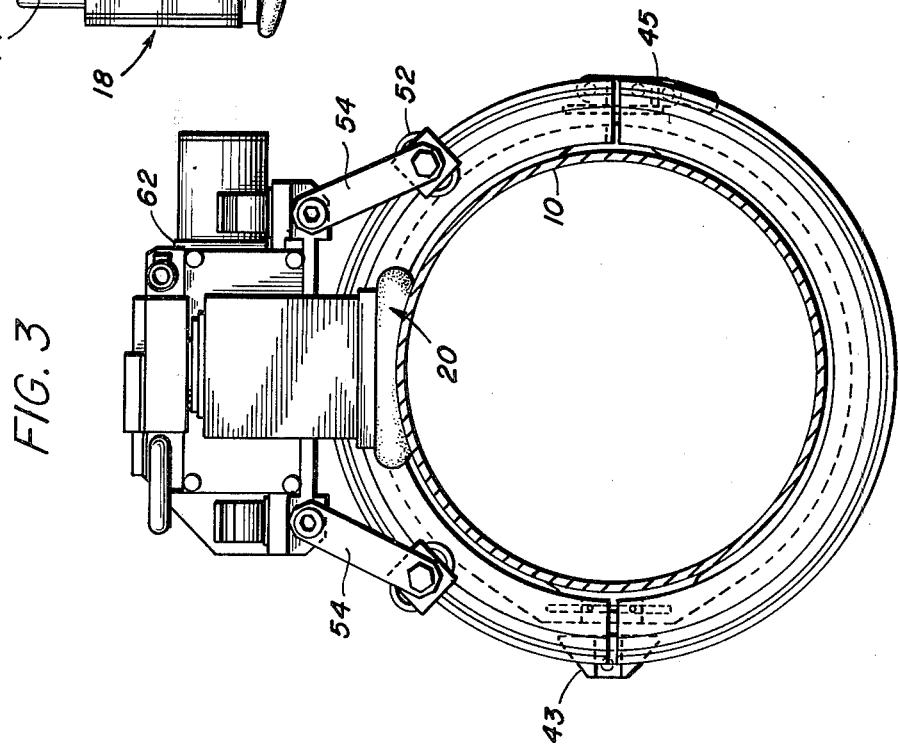

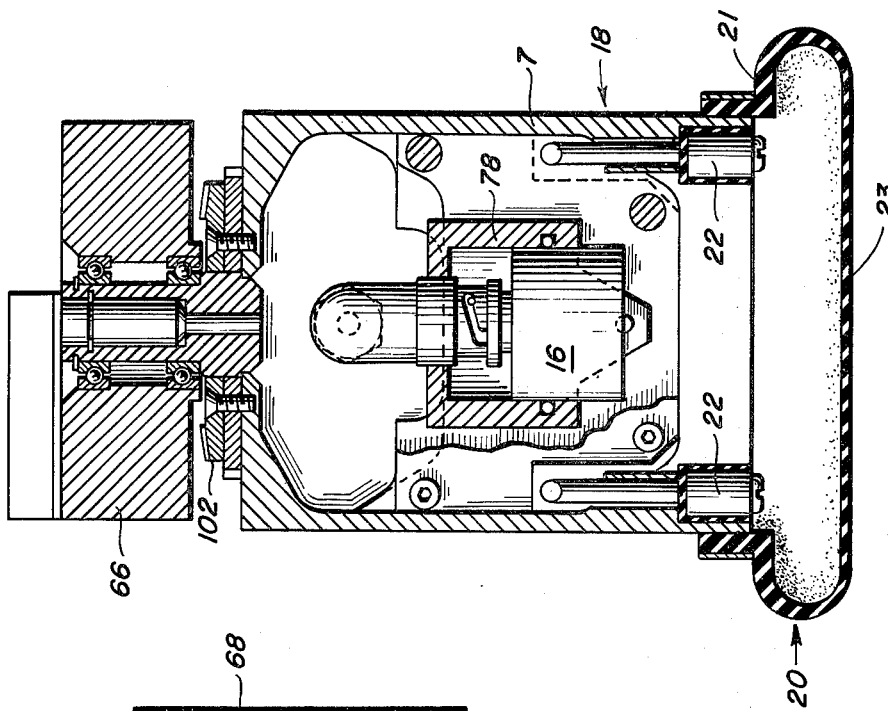
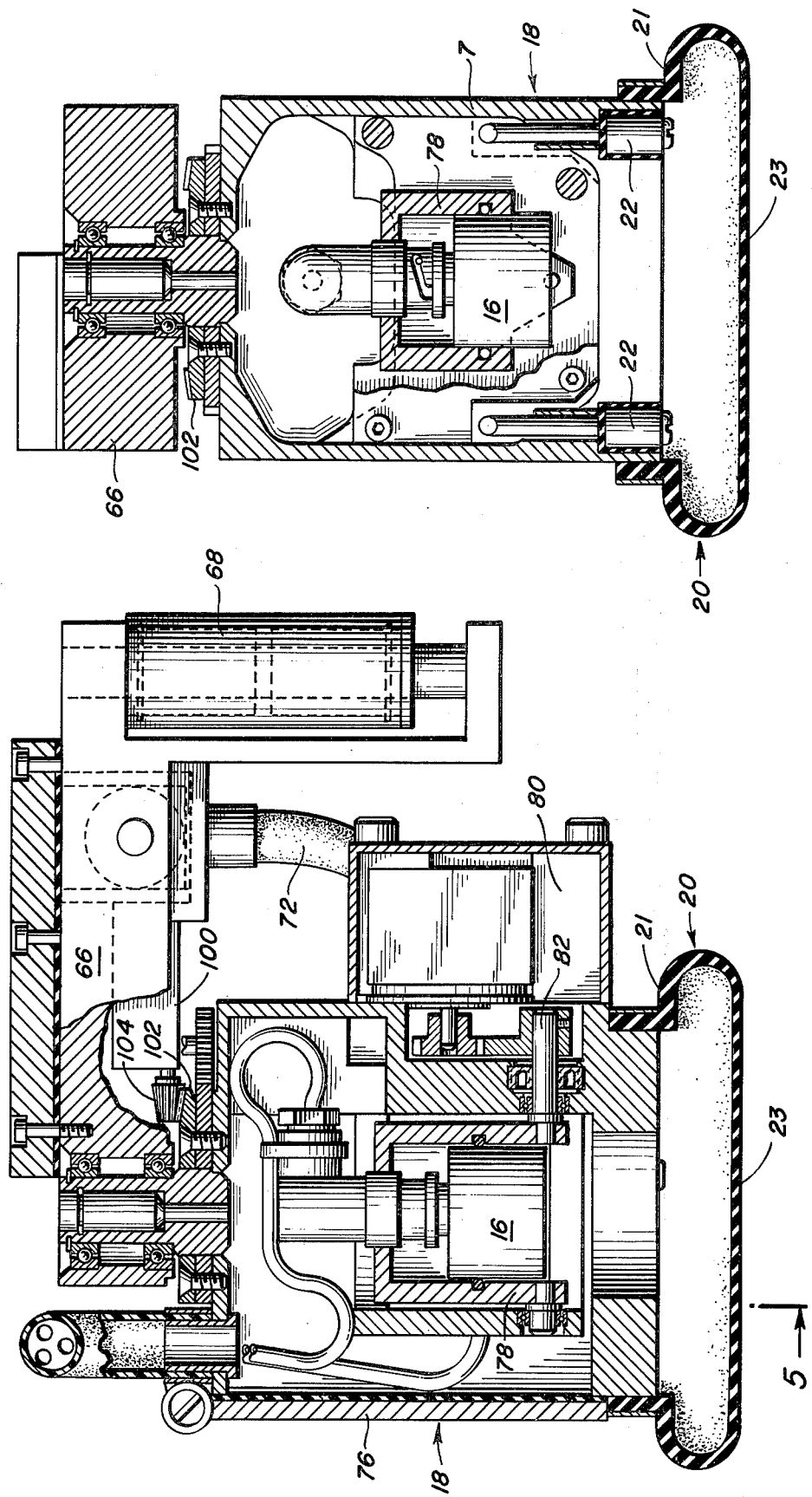

ULTRASONIC PIPE TESTING SYSTEM

BACKGROUND OF THE INVENTION

This invention pertains to nondestructive testing of structural shapes having regular cross sections, such as pipes and the like. Testing is accomplished by the well known pulse-echo technique using an ultrasonic transducer for sending sound waves through an object and receiving reflected waves which indicate soundness of the object being tested. In particular, the invention resides in the manipulation of the ultrasonic transducer in relation to the object from a remote location so that the object being tested can be inspected in longitudinal, circumferential shear, or axial shear modes as commonly applied in testing using ultrasonic means.

The present invention is an improvement over the apparatus disclosed in U.S. Pat. No. 3,777,552 drawn to an ultrasonic scanning system for in-place inspection of brazed tube joints and to improved transducer manipulating devices such as shown in U.S. Pat. No. 3,824,843. In particular, the present invention is an improvement over prior art devices in that it, among other things, enables an operator to perform remote inspection of pipe-to-pipe butt welds in stainless steel piping found in heavy water nuclear reactors used in electric power generating. The device permits inspection of welds while the reactor is in-service because the transducer or search head can be manipulated around the pipe being tested from a remote location thus removing the test operator from exposure to stray radiation from the nuclear reactor.

SUMMARY OF THE INVENTION

The present invention pertains to a pipe weld inspection system for fast, accurate volumetric testing of circumferential welds in the pipe. The system includes four basic parts; namely, a track and platform assembly which is affixed to the pipe being tested and provides operative means for conducting the platform around the circumference of the pipe being tested; a drive and search head assembly which is affixed to the platform and carries the search head, e.g., ultrasonic transducer, around the circumference of the pipe and longitudinally along the axis of the pipe according to a predetermined pattern; an ultrasonic instrument to power the transducer and to receive and evaluate signals returned through said transducer; and a control console for controlling the position and rate of movement of the search head as well as indicating position of the search head. The complete system enables remote operation and reading of data without sacrificing complete volumetric testing of the structural shape. It is possible to include in the system recorders for recording the movement of the transducer and a C-scan recorder for making a permanent record of any indications uncovered by the ultrasonic search head.

Therefore, it is the primary object of this invention to provide an improved ultrasonic inspection system for volumetric testing of structural shapes having regular cross sections.

It is another object of this invention to provide a system for volumetric testing of circumferential welds in structural pipes using standard single longitudinal wave transducer pulse-echo ultrasonic techniques.

It is yet another object of this invention to provide a method for volumetric testing of circumferential welds by remote control of the test instrument and remote gathering and evaluation of test results.

It is still a further object of the present invention to provide an ultrasonic inspection system for inspecting pipe-to-pipe butt welds in stainless steel piping used in heavy water nuclear reactors.

BRIEF DESCRIPTION OF THE DRAWING

FIG. 1 is a schematic diagram of the system according to the invention.

FIG. 2 is a horizontal elevation of the track and platform and drive and search head assemblies shown affixed to a pipe.

FIG. 3 is a side elevational view of the apparatus of FIG. 2.

FIG. 4 is an enlarged cross-sectional view of the search head assembly shown in FIG. 2.

FIG. 5 is a section taken along the line 5—5 of FIG. 4.

FIGS. 6a–6c are diagrammatic representations of the test modes of the system according to the present invention.

DESCRIPTION OF THE PREFERRED EMBODIMENT

The inspection system of the present invention is ideally suited for inspecting pipe-to-pipe butt welds in stainless steel piping found in heavy water nuclear reactors while the reactor is in-service and without exposing the test operator to undue radiation hazard. The inspection is volumetric in nature and is performed using the standard single longitudinal wave transducer pulse-echo ultrasonic method. Incorporated in this system is the capability of performing shear wave inspections by positioning the transducer at an angle to the object being inspected in order to perform inspections up to 70° shear penetration.

The schematic drawing of FIG. 1 shows the overall system in general in relation to a pipe 10 having a weld 12 to be inspected. The weld 12 will be inspected using a conventional ultrasonic test instrument 14 with associated transducer 16. Transducer 16 is carried in a search head housing 18 which housing 18 is closed by a flexible boot 20. Details of the search head housing and boot will be explained in more detail in relation to FIGS. 2–5. The search head housing 18 may include a pair of couplant monitoring transducers 22 which in turn are connected to an alarm 24 as will hereinafter be more fully explained. The search head housing 18 is caused to move in relation to the pipe 10 by a structure that is generally referred to as a carriage 26 as is more fully shown in FIGS. 2 and 3. Also included is a control console 28 for controlling movement of the carriage 26 and which is adapted to record the position of the transducer in relation to the pipe 10. The control console and the ultrasonic test instrument are offered for sale by TekTran, Box 460, Newark, Ohio, 43055, and are detailed in TekTran Bulletin TP-1. The ultrasonic test instrument 14 is sold by TekTran under the trademark IMMERSCOPE as Model 725. It is also possible to include in this system a data logger 30 for providing a permanent record of the pattern of movement of the search head housing 18. Such recorders are well known in the art. The system can include a conventional C-scan recorder 32 such as is well known in the art as exemplified by reference to the textbook, *Ultrasonic Engineering* by Julian R. Frederick, published by John Wiley and Sons, Inc., under copyright date of 1965 at pages 255-256. It is well to point out that such reference is considered a standard in the industry and discloses basics of ultrasonic testing including the conventional pulse-echo technique.

Referring to FIG. 2, there is shown the preferred apparatus that is generally denoted by the carriage block 26 of FIG. 1. The carriage includes a track and platform assembly designated generally as 40 which includes track module 42 and platform module 44, a drive and search head assembly generally referred to as 60 including a drive unit 62, and search head assembly 18.

The member 42 is in the form of a cylindrical pipe clamp which includes a hinge 43 and latch 45 for securing member 42 to a structural shape such as pipe 10. On the inner surface of member 42 is a compression mounting such as an inflatable bladder inflated through fitting 46. Such fittings are well known in the art and provide for mar-free mounting of the member 42 to the pipe 10. Member 42 includes a circumferential gear rack 48 which mates, through an intermediate gear (not shown), with a corresponding drive gear on drive member 62. Member 42 can be readily installed on a pipe by opening latch 45 and dropping the member 42 over the pipe 10. Member 42 further includes peripheral chamfered edges 50 which are mated to carriage wheels 52 on platform 44. Platform 44 is adapted to the member 42 to rotate completely around member 42 when member 42 is affixed to pipe 10. Drive wheels 52 are supported by legs 54 as shown in FIGS. 2 and 3. Platform 44 includes a flat mounting surface or deck 56 for receiving drive unit 60. Also included are a plurality of dowel holes (not shown) that can be used in connection with a lock mechanism operated by locking arms 58 on drive unit 62 to rigidly fix unit 62 to platform 56 for rotation about the pipe 10.

Drive unit 60 includes housing 62 which contains all of the necessary drive motors and positioning encoders for guiding the platform 56, drive housing 62, and search head housing 18 around the circumference of the pipe as defined by the clamping member 42 as well as providing longitudinal movement of the housing 18 as will hereinafter be explained. Such guide motors and encoders are well known in the art and are connected by conventional electrical conduits to the control console 28 (FIG. 1) as is also well known in the art. The housing 62 includes means to support the search head assembly 18 through a structural member 64 which is adapted to move longitudinally in relation to the longitudinal axis of the pipe 10. The support member 64 is driven through a gear arrangement as is well known in the art. Member 64 supports the search head assembly designated generally as 18 by means of structural member 66, 68, and fasteners 70. The necessary electrical conduits 72 and 74 between the search head assembly 18 and the control and ultrasonic units 28 and 14 are carried through the member 62 and project therefrom (not shown) for eventual connecting to the instruments. As shown in FIGS. 4 and 5, search head assembly 18 consists of an outer housing 76, inner support yoke 78, and drive mechanism 80 which drive mechanism has suitable connectors 82 to yoke 78 for moving the transducer 16 in the desired angular relationship.

Search head assembly 18 includes a drive motor 100, bevel gear 104, and crown gear 102 secured to the housing 76 in order to rotate the transducer housing 76 about a vertical axis as shown in FIG. 6c by the arrow labeled head rotation. This enables complete volumetric inspection of weld 12 through compound movement of search head 18.

The search head assembly 18 has included therein a pair of transducers 22 which are used to detect the presence of pressurized fluid couplant. Transducers 22 are connected to an alarm 24 (FIG. 1) so that if the level of fluid is too low, the alarm will be activated and the operator can take the necessary corrective steps. The portion of the housing 76 below transducer 16 is open and it is covered by a flexible boot 20 of a varying wall thickness. The thinner wall portion 23 provides a flexible contact surface. The area defined by the housing 72 and boot 20 is filled with the pressurized fluid normally used in ultrasonic testing. One preferred fluid is ordinary water which is kept in the boot under pressure. The boot surface 23 is provided with a series of small bleed holes (not shown) so that a small amount of fluid is forced through the boot 20 on to the surface being inspected and provides ultrasonic coupling through the trapped water between the object and boot. The bleed holes are sized so the water bleeds through and is not squirted on the surface of pipe 10. The boot 20, of necessity, is flexible so it will conform to the contour of the pipe 10 being tested and will allow for nonuniformities in the wall of the pipe 10 being tested.

There is shown in FIG. 6 a one path of travel in the axial scan mode for the device of FIGS. 1-5. FIG. 6b shows in schematic form a circumferential scan mode that can be practiced with the device of FIGS. 1-5 and FIG. 6c shows the transducer oriented for shear wave testing.

In operation, the pipe to be inspected will be selected and the member 40 carrying the platform 56 will be clamped to the pipe. Drive and search head assembly 60 will be affixed to the platform 56 and the proper electrical connections will be made to the control console 28, the ultrasonic unit 14, and the alarm unit 24. The control unit will be energized and the control electronics set to provide the scan motion for the system. Scanning will commence and the meter on the ultrasonic test instrument 14 will be monitored for an indication of discontinuities in the weld under test. If required, the data logger 30 and C-scan recorder 32 will be incorporated to provide hard copies of the test profile.

A weld inspection system according to the present invention is generally quick and accurate, being able to perform a complete nondestructive volumetric test of a butt weld in a pipe. The unit can be adaptable to all pipe sizes 6 inches and larger by changing only the track assembly 42. The compact design permits operation in cramped quarters and in any position, i.e., vertical, horizontal, or in between. A unit constructed and operated according to the specification has the following characteristics.

1. It is adaptable to from 6 inches to any maximum outside diameter.
2. The test unit itself (drive and search head assembly 60) is only 5½ inches high and 20 inches long with the transducer housing 18 fully retracted.
3. A unit such as disclosed herein is capable of testing angles in steel in a continuously variable manner from 0° to 70°.
4. The search head rotation, e.g., transducer 16, is continuously variable from 0° to 90°.
5. The other has a variable circumferential scan length to 90 inches of circumference and a variable axial scan length of 6.5 inches.
6. With a control manufactured by TekTran, the index width is from 0.1 to 0.9 inches with a scan speed continuously variable from 0 to 100 inches per minute.
7. The unit constructed according to the present disclosure has a drive and search head assembly weight of 25 pounds, a track assembly weight (dependent upon pipe diameter) between 16 and 50 pounds in a control console weight of 64 pounds.
8. The system is adaptable to include a C-scan recorder or data logger.

As stated above, the ultrasonic inspection system disclosed herein is ideally suited for an in-service inspection of pipe-to-pipe butt welds contained in piping associated with heavy water nuclear power plants. Once the track and platform assembly and drive and search head assembly are in place, an operator can remotely control all the testing from as far away as 150 feet. At this distance, there is very minor radioactivity present and there is no real threat to operator safety except in those instances of prolonged exposure.

Having thus described my invention, what I desire to be secured by Letters Patent of the United States is set forth in the following claims.

I claim:

1. A system for nondestructive testing internal soundness of structural members having a generally circular cross section comprising in combination:

a track and platform assembly including means for securing said assembly to the structural member to be tested and means for guiding said platform along a path defined by said securing means;

a drive and search head assembly removably secured to said platform, said drive and search means including a support member slidably fitted to said drive portion of said drive and search head assembly;

said support member carrying a fluidtight search head housing having an open bottom;

an ultrasonic transducer pivotally mounted within said search head housing for movement angularly to the vertical axis of said housing for focusing a beam through the open bottom of said housing;

a flexible boot closing said open bottom, said boot transmitting ultrasonic pulses and providing a contact surface to structural members being tested, said boot having a plurality of orifices to allow fluid couplant contained in said boot to contact said structure member to provide an interface of couplant between said boot and said structural member;

means for powering said transducer and detecting return signals to said transducer; and electronic means for controlling said drive and search head assembly for movement along a path at a predetermined rate and for controlling the angular position of said transducer.

2. A system according to claim 1 wherein there is included at least one additional transducer inside said boot to monitor the presence of couplant in said boot and provide a no test signal on the said electronic control means.

3. A system according to claim 1 including means to record the position of the search head and transducer during operation.

4. A system according to claim 1 including a C-scan recorder for providing a permanent record of defects indicated by said transducer.

5. A system according to claim 1 wherein said boot is pressurized with water.

6. A system according to claim 1 wherein the boot is sized so that a 1-inch diameter transducer can be pivoted plus or minus 26° to the axis without moving the ultrasonic pulse beam out of the area of contact between couplant and crystal.

7. A system according to claim 1 wherein said track and platform assembly securing means includes a pair of semi-circular clamps containing a gear rack and an inflatable compression mount inside said clamps so that when said clamps are affixed to a structural shape said gear rack defines a path around said structural shape.

8. A system according to claim 7 wherein said platform is mounted on said clamps and contains a gear mounted for engagement with said gear rack for propelling said platform along a path defined by said rack.

* * * * *